(12) United States Patent
Johnston et al.

(10) Patent No.: US 9,710,005 B2
(45) Date of Patent: Jul. 18, 2017

(54) PARALLEL BUS

(71) Applicant: SunPower Corporation, San Jose, CA (US)

(72) Inventors: Keith Johnston, Palo Alto, CA (US); Nicholas Ford, Albany, CA (US)

(73) Assignee: SunPower Corporation, San Jose, CA (US)

( * ) Notice: Subject to any disclaimer, the term of this patent is extended or adjusted under 35 U.S.C. 154(b) by 106 days.

(21) Appl. No.: 14/529,965

(22) Filed: Oct. 31, 2014

(65) Prior Publication Data

US 2016/0049791 A1    Feb. 18, 2016

Related U.S. Application Data

(60) Provisional application No. 62/036,529, filed on Aug. 12, 2014.

(51) Int. Cl.
| | |
|---|---|
| *H05H 5/00* | (2006.01) |
| *G05F 1/67* | (2006.01) |
| *H02J 1/00* | (2006.01) |
| *H02J 3/38* | (2006.01) |
| *H02M 7/42* | (2006.01) |

(52) U.S. Cl.
CPC .................. *G05F 1/67* (2013.01); *H02J 1/00* (2013.01); *H02J 3/385* (2013.01); *H02M 7/42* (2013.01); *Y02E 10/58* (2013.01)

(58) Field of Classification Search
CPC ........................................................ G05F 1/67
USPC ........................................................ 361/104
See application file for complete search history.

(56) References Cited

U.S. PATENT DOCUMENTS

| | | | | |
|---|---|---|---|---|
| 6,268,559 B1* | 7/2001 | Yamawaki | ................. | G05F 1/62 136/243 |
| 7,342,171 B2* | 3/2008 | Khouri | ...................... | E04D 5/00 136/245 |
| 8,036,005 B2* | 10/2011 | Gebert | ............... | H01H 85/0241 361/104 |
| 8,922,185 B2* | 12/2014 | Ehlmann | ................. | H02J 3/385 323/284 |
| 2001/0023703 A1* | 9/2001 | Kondo | ............. | H01L 31/02021 136/244 |
| 2003/0075211 A1* | 4/2003 | Makita | ................... | F24J 2/5237 136/244 |
| 2004/0264225 A1* | 12/2004 | Bhavaraju | ................. | G05F 1/67 363/120 |
| 2005/0105224 A1* | 5/2005 | Nishi | .................... | H02M 3/285 361/18 |
| 2008/0238195 A1* | 10/2008 | Shaver | ................... | H02H 9/041 307/18 |

(Continued)

FOREIGN PATENT DOCUMENTS

WO    WO-2013150306    10/2013

OTHER PUBLICATIONS

International Preliminary Report on Patentability from PCT/US2015/044743 mailed Oct. 23, 2015, 12 pgs.

*Primary Examiner* — Stephen W Jackson
(74) *Attorney, Agent, or Firm* — Blakely Sokoloff Taylor Zafman LLP

(57) ABSTRACT

A photovoltaic (PV) system can include strings of PV collection devices. A positive parallel bus can be coupled to positive terminals of first and second strings and a negative parallel bus can be coupled to negative terminals of first and second strings.

13 Claims, 11 Drawing Sheets

(56) References Cited

U.S. PATENT DOCUMENTS

| | | | |
|---|---|---|---|
| 2009/0242272 A1* | 10/2009 | Little | H01L 31/05 174/72 A |
| 2010/0001587 A1* | 1/2010 | Casey | H01L 31/02021 307/80 |
| 2010/0253151 A1* | 10/2010 | Gerhardinger | G05F 1/67 307/82 |
| 2011/0139214 A1 | 6/2011 | Cherukupalli | |
| 2011/0198935 A1* | 8/2011 | Hinman | H02H 7/1222 307/80 |
| 2011/0209741 A1* | 9/2011 | Solon | H01H 85/0241 136/244 |
| 2012/0004780 A1* | 1/2012 | Miller | F24J 2/38 700/286 |
| 2012/0104863 A1 | 5/2012 | Yuan | |
| 2012/0158205 A1* | 6/2012 | Hinman | G05B 23/0216 700/297 |
| 2012/0160297 A1* | 6/2012 | Yamakawa | H01L 31/02021 136/244 |
| 2013/0062958 A1 | 3/2013 | Erickson, Jr. et al. | |
| 2013/0106194 A1 | 5/2013 | Jergovic et al. | |
| 2014/0208670 A1* | 7/2014 | Koch | H01L 31/05 52/173.3 |

\* cited by examiner

PARALLEL BUS

PRIORITY CLAIM

This application claims the benefit of U.S. Provisional Application No. 62/036,529, filed Aug. 12, 2014, entitled "Photovoltaic Systems with Maximum Power Point Tracking", by Johnston et al., the entire contents of which are hereby incorporated by reference.

BACKGROUND

Photovoltaic systems can operate at any voltage between short-circuit voltage where the voltage is zero and open-circuit voltage where the voltage is at the maximum that can be generated by the photovoltaic system. There is an associated current with each point of voltage operation. In order to maximize the output power of the photovoltaic system, the optimal current and voltage operating points must be located. The operating point where the output power of the photovoltaic system is at its maximum is known as the maximum power point ("MPP"). The voltage and current of the photovoltaic system at the MPP is the maximum power voltage (Vmp) and the maximum power current (Imp), respectively.

In some instances, some MPP tracking methods get stuck tracking local MPPs, which are local maxima on the power-voltage curves. Local MPPs have similar qualities to the true MPP but do not represent the true maximum power of the photovoltaic system. The true MPP is also referred to as the "global MPP" because it is the MPP for the entire I-V curve of the photovoltaic system. In contrast, a local maximum power point is an MPP only for a section of the I-V curve.

Structures and techniques disclosed herein can increase the likelihood that the system tracks the global MPP rather than a local MPP.

DETAILED DESCRIPTION

Figure 1:
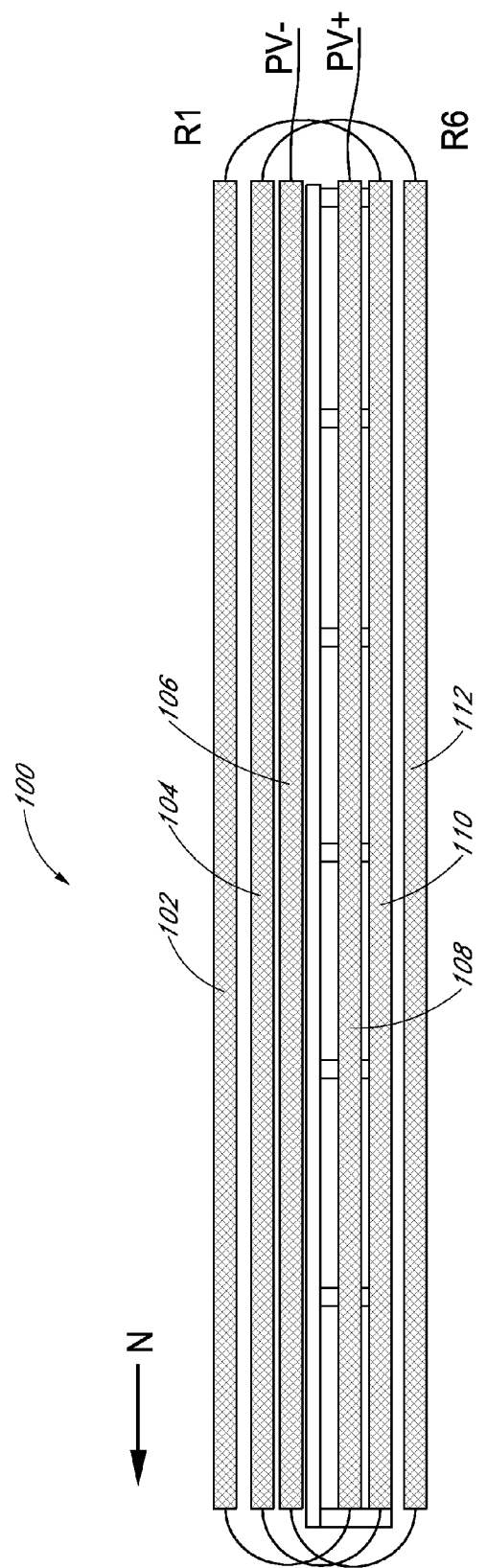
FIG. 1 illustrates an example tracker layout in which the rows are electrically coupled together in series.

The following detailed description is merely illustrative in nature and is not intended to limit the embodiments of the subject matter of the application or uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps.

"Configured To." Various units or components may be described or claimed as "configured to" perform a task or tasks. In such contexts, "configured to" is used to connote structure by indicating that the units/components include structure that performs those task or tasks during operation. As such, the unit/component can be said to be configured to perform the task even when the specified unit/component is not currently operational (e.g., is not on/active). Reciting that a unit/circuit/component is "configured to" perform one or more tasks is expressly intended not to invoke 35 U.S.C. §112, sixth paragraph, for that unit/component.

"First," "Second," etc. As used herein, these terms are used as labels for nouns that they precede, and do not imply any type of ordering (e.g., spatial, temporal, logical, etc.). For example, reference to a "first" row of a PV tracker does not necessarily imply that this row is the first row in a sequence; instead the term "first" is used to differentiate this row from another row (e.g., a "second" row).

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

"Coupled"—The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically.

"Inhibit"—As used herein, inhibit is used to describe a reducing or minimizing effect. When a component or feature is described as inhibiting an action, motion, or condition it may completely prevent the result or outcome or future state completely. Additionally, "inhibit" can also refer to a reduction or lessening of the outcome, performance, and/or effect which might otherwise occur. Accordingly, when a component, element, or feature is referred to as inhibiting a result or state, it need not completely prevent or eliminate the result or state.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import.

This specification first describes an electrical configuration that can result in tracking local MPPs, followed by various independent row configurations that can reduce the likelihood of tracking local MPPs. The specification then describes a parallel bus scheme that can be used with the electrically independent row configuration or other configurations. Various examples are provided throughout.

FIG. 1 shows an example six-row tracker layout that includes row 102 (R1), which can be the easternmost row on the tracker, row 112 (R6), which can be the westernmost row on the tracker, and rows 104, 106, 108, and 110 in between rows 102 and 112. As used herein, a row is a group of solar collection devices (e.g., cells, laminates, modules, panels, receivers) that is parallel to the axis of rotation (e.g., for a single axis tracker). The example solar tracker of FIG. 1 can include six rows of solar collection devices and corresponding mirrors to concentrate light on the solar collection devices and can be aligned in the north-south direction. As an alternative to mirrors, in other CPV systems, optics other than mirrors, such as refraction optics, can be used. Although many examples in this specification, including the examples of FIGS. 1, 2A, 2B, and 5, illustrate and describe a six-row tracker, other configurations also exist (e.g., two row, three row, four row, eight row, etc.). As shown in FIG. 1, in some circumstances, all the rows of solar collection devices can be connected in series. In one such example, the series connection of all the rows of solar collection devices makes a 1000V PV string.

At some azimuth angles (morning and evening), a solar tracker can shade an adjacent solar tracker. For example, for a six-row tracker in which trackers are in a north-south configuration with trackers to the east or west of one another, at the beginning of a day, a solar tracker can initially shade the first one or more rows (e.g., 102, 104, 106) of an adjacent solar tracker to its west. As the solar elevation angle increases, the shading can progressively reduce the number of shaded rows (e.g., two rows, such as 102 and 104). In one specific example, for a six-row tracker at a particular spacing between trackers, at under approximately 68° solar elevation, no rows are shaded and the second solar tracker can continue to operate at a full capacity until the solar elevation angle reaches 68° with a western azimuth angle. Continuing the example, at the end of the day, the shading progressively increases from one (e.g., row 112) to three rows (e.g., rows 112, 110, 108). Depending on the maximum tracking angle, the number of shaded rows can be effectively limited, for example, to rows 102 and 104 in the morning and rows 110 and 112 in the evening.

Figure 2A:
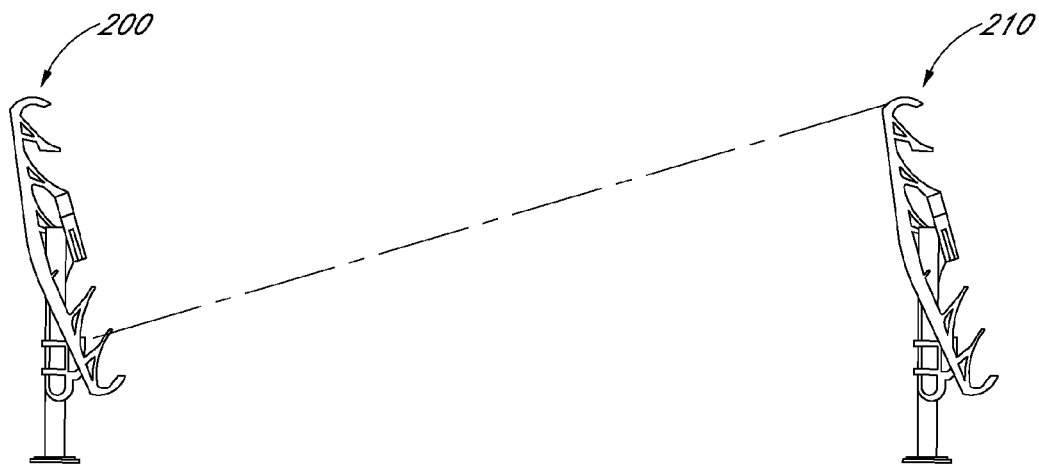
FIGS. 2A and 2B illustrate tracker shading diagrams for an example tracker configuration, according to some embodiments.
Figure 2B:
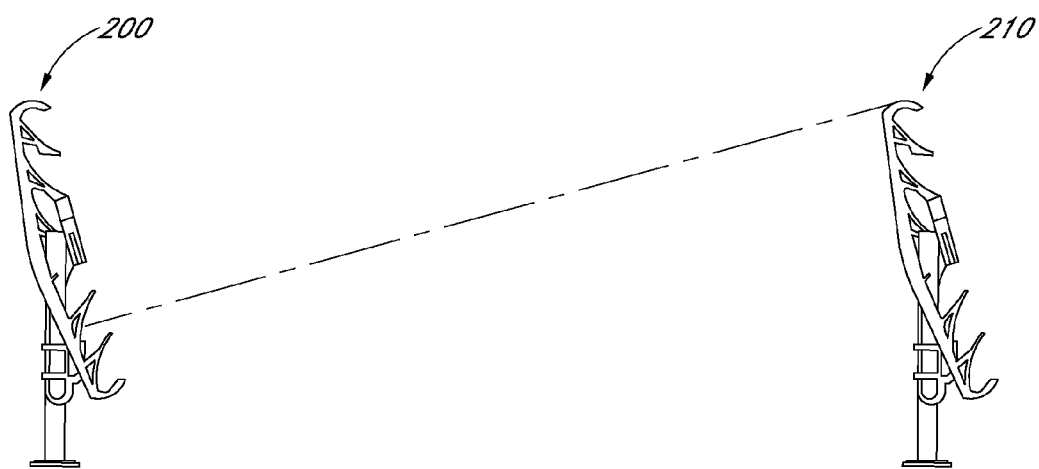

FIGS. 2A-2B illustrate the above-described principles in the form of tracker shading diagrams for an example multi-tracker configuration. FIG. 2A illustrates an example scenario in which trackers 200 and 210 are rotated to a particular angle (e.g., approximately 73.5'). Such a particular angle can correspond to the point at which the bottommost row (e.g., corresponding to row 102) of solar collection devices of tracker 200 is fully shaded by tracker 210. FIG. 2B illustrates the degree to which the second row from the bottom (e.g., corresponding to row 104) of solar collection devices of tracker 200 is shaded when the tracker reaches a slightly higher angle (e.g., approximately 75°) than in FIG. 2A.

Although specific examples of angles are used in this specification, such as in FIGS. 2A and 2B, in other examples, shading can exist at other angles. For example, for a tracker with a different number of rows, different spacing between trackers, other size of trackers, etc., other tracker angles can cause similar shading.

Figure 3:
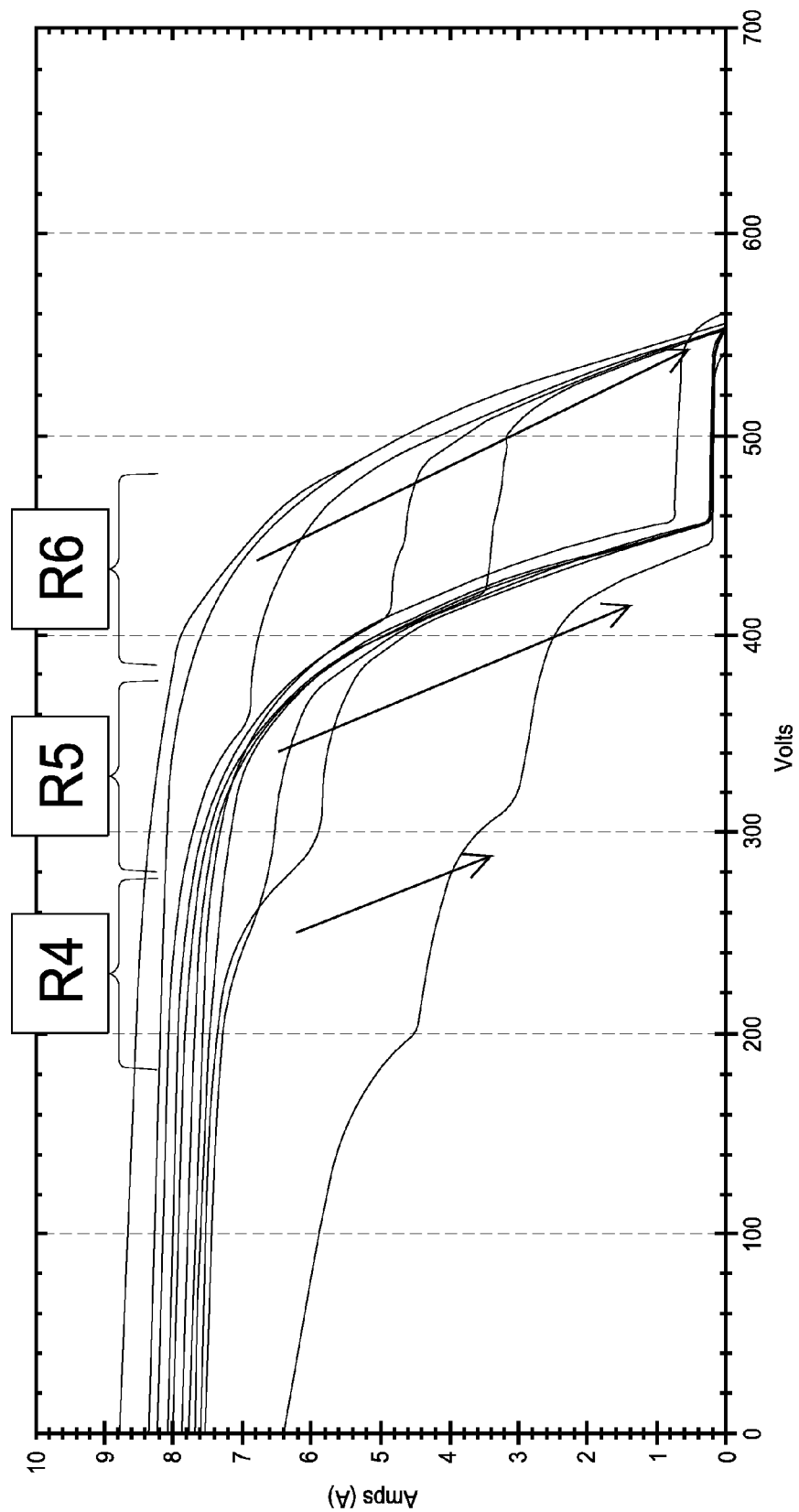
FIG. 3 illustrates example I-V curves having local MPPs.

For a system in which the rows of solar collection devices are all connected in series, as in the example of FIG. 1, one or more receiver bypass diodes can activate once the shading fraction of the row increases beyond a certain threshold (e.g., approximately 20%), effectively bypassing production for the whole row. As a result, the maximum power voltage (Vmp) can drop by ~⅙ as each additional row becomes shaded. In some instances, however, it is not a distinct transition. For example, as each row becomes progressively more shaded, the current output from that row can proportionally drop. This can form local MPPs (local maxima on the P-V curve) at higher voltages than the second MPP, which is at a higher current. FIG. 3 illustrates such an example of local MPPs, for a multi-row solar tracker with the rows connected in series, caused by tracker-to-tracker shading. The arrows indicate the progression of the shading fraction within a row (R6, R5, and R4, respectively).

Figure 4:
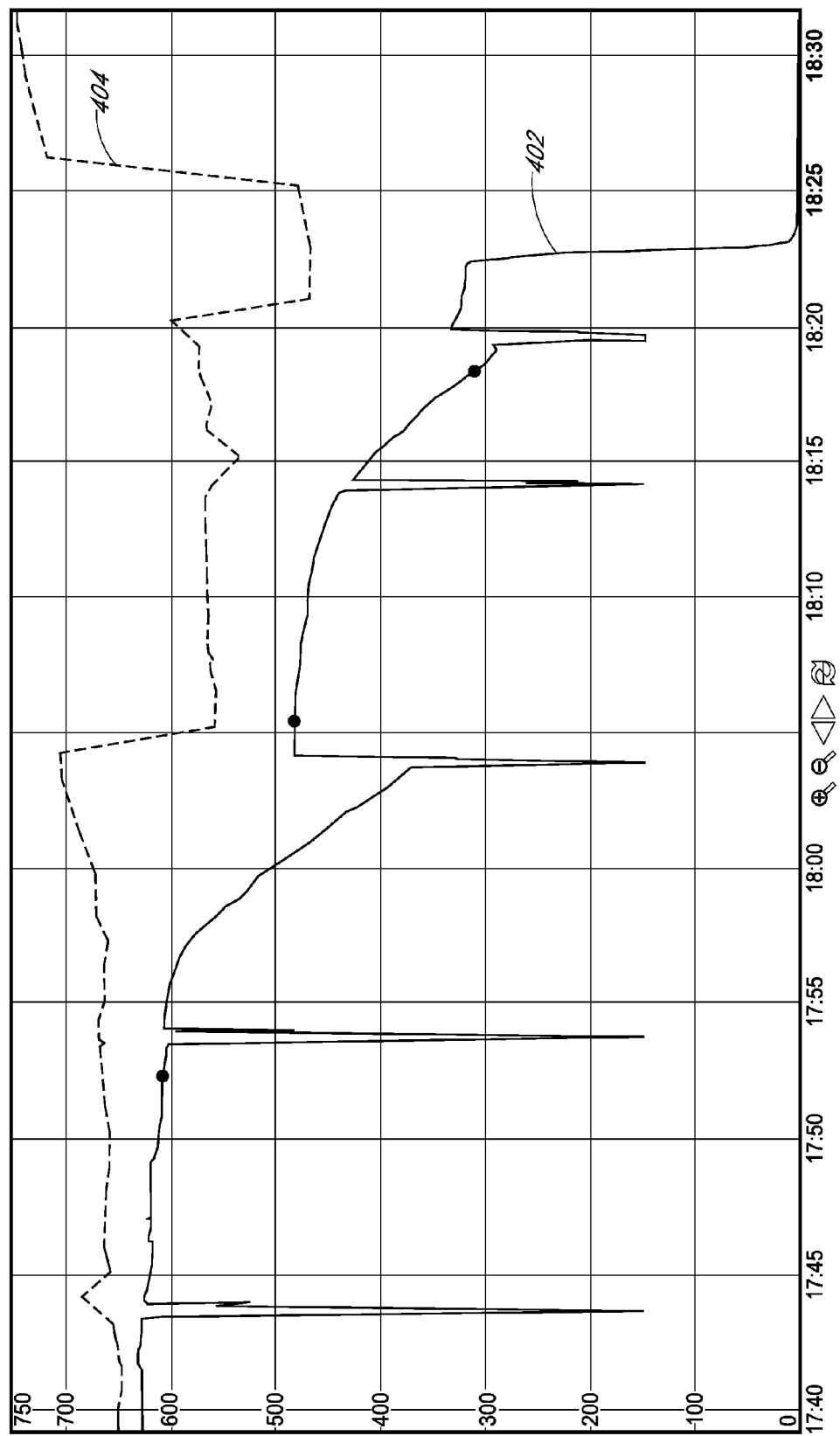
FIG. 4 illustrates an example power production profile, according to some embodiments.

In some instances, a maximum power point tracking module (e.g., in an inverter) may follow the higher voltage local MPP rather than the global MPP. Following a local MPP has the potential to curtail energy production on a daily basis. A curve sweeping or other MPP tracking algorithm can be used to search for the global MPP, for example, when prompted at certain tracker angles. Example MPP tracking algorithms are described in commonly owned U.S. application Ser. No. 13/431,854, entitled "Photovoltaic Systems with Local Maximum Power Point Tracking Prevention and Methods for Operating Same", by Judkins et al. An end-of-day power production profile demonstrating this functionality is shown in FIG. 4. Operation during partial shading can cause the bypass diodes to pass current resulting in a discretized (stepped) power production profile 402 as depicted in FIG. 4. This means that some of the available power is not being harnessed, and additional power is dropped across the activated diodes, which can add up over a full tracker row.

As shown in FIG. 4, the power production profile (curve 402) periodically spikes to low values, which corresponds to the rapid curve sweeps taking place from the MPP tracking algorithm. When a more optimal operating point is discovered, the voltage (curve 404) drops by an amount proportional to the number of shaded rows.

In some instances, the location of a global MPP can depend on the shading fraction of the row, but there can be a distinct cross-over point at which a lower voltage MPP has a higher power output. For example, once the current of the shaded row drops by more than ⅙ of its peak value, the lower voltage MPP becomes the global MPP because full current is output with only a ⅙ drop in voltage (i.e., the diodes are activated and the row is bypassed).

To address some of the aforementioned issues in tracking the global MPP, a tracker is disclosed with electrically independent rows.

Figure 5:
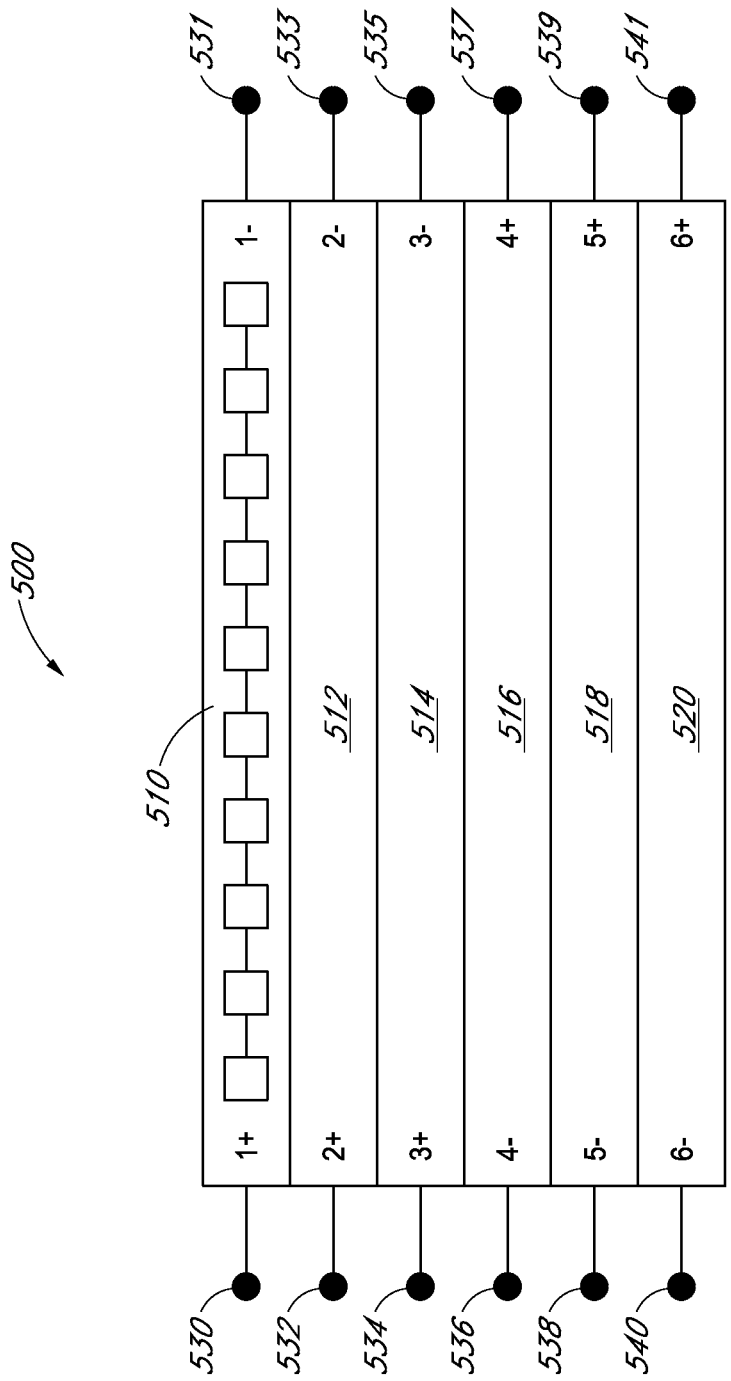
FIG. 5 illustrates a layout of an independent row electrical scheme, according to some embodiments.

FIG. 5 illustrates an example layout of an independent row electrical scheme for a six-row solar tracker. All six rows 510, 512, 514, 516, 518, and 520 are shown with their corresponding negative (531, 533, 535, 536, 538, and 540) and positive leads (530, 532, 534, 537, 539, and 541). The connections are shown open-circuited to better illustrate the row-to-row isolation, according to some embodiments.

FIG. 5 illustrates ten solar collection devices (indicated by the squares) connected in series in row 510 to form a row of solar collection devices. For clarity, the individual solar collection devices are not shown in the other rows 512, 514, 516, 518, and 520, but are present nevertheless. Although ten solar collection devices are shown in FIG. 5, other numbers can be used in other implementations. Moreover, note that the disclosed row independence schemes can apply to other solar trackers that utilize multiple rows of solar cells, laminates, panels, or modules, and are subject to systematic shading. One alternative to row independence for mitigating the effects of shading is backtracking. Backtracking, however, does not work well for concentrating PV ("CPV") systems because for CPV, the plane of array needs to be normal to the solar beam vector. Accordingly, the disclosed structures and techniques offer the additional advantage that it works well in inhibiting the effects of shading, even in CPV systems.

In various embodiments, the rows of solar collection devices for a particular tracker can be electrically independent or isolated from each other and each row can be controlled by a separate MPPT configured to perform separate maximum power point tracking for that row, which can inhibit the formation of local MPPs. Instead of combining all six rows into a single string, each string can include extended serial connections of solar collection devices down the length of a row of a tracker. As shown, each row can include a negative and a positive lead. Because the negative and positive electrical connectors are at opposite ends of the solar tracker in the illustrated embodiment, homerun cables can be used to bring the extremities of the string to a central node. A MPPT control module can be included in string inverters (several per solar tracker) or MPPT control modules can be deployed in-line with inverters. In some embodiments, central inverters can be used instead of an individual inverter per row as long as row electrical independence is maintained. Various examples are illustrated and described below at FIGS. 7 and 8.

With row independence, the MPP of each row (or groups of rows, such as rows 802, 808, 814, etc. of FIG. 8, with similar shading profiles) can be tracked even during partial shading. Accordingly, no substantial mismatch is induced by the encroaching tracker-to-tracker shading. Instead of the power output dropping in discrete steps as additional rows become shaded, the MPP can be maintained on each independent row and the power drop occurs only with an increasing shading fraction. This response is depicted in FIG. 6.

Figure 6:
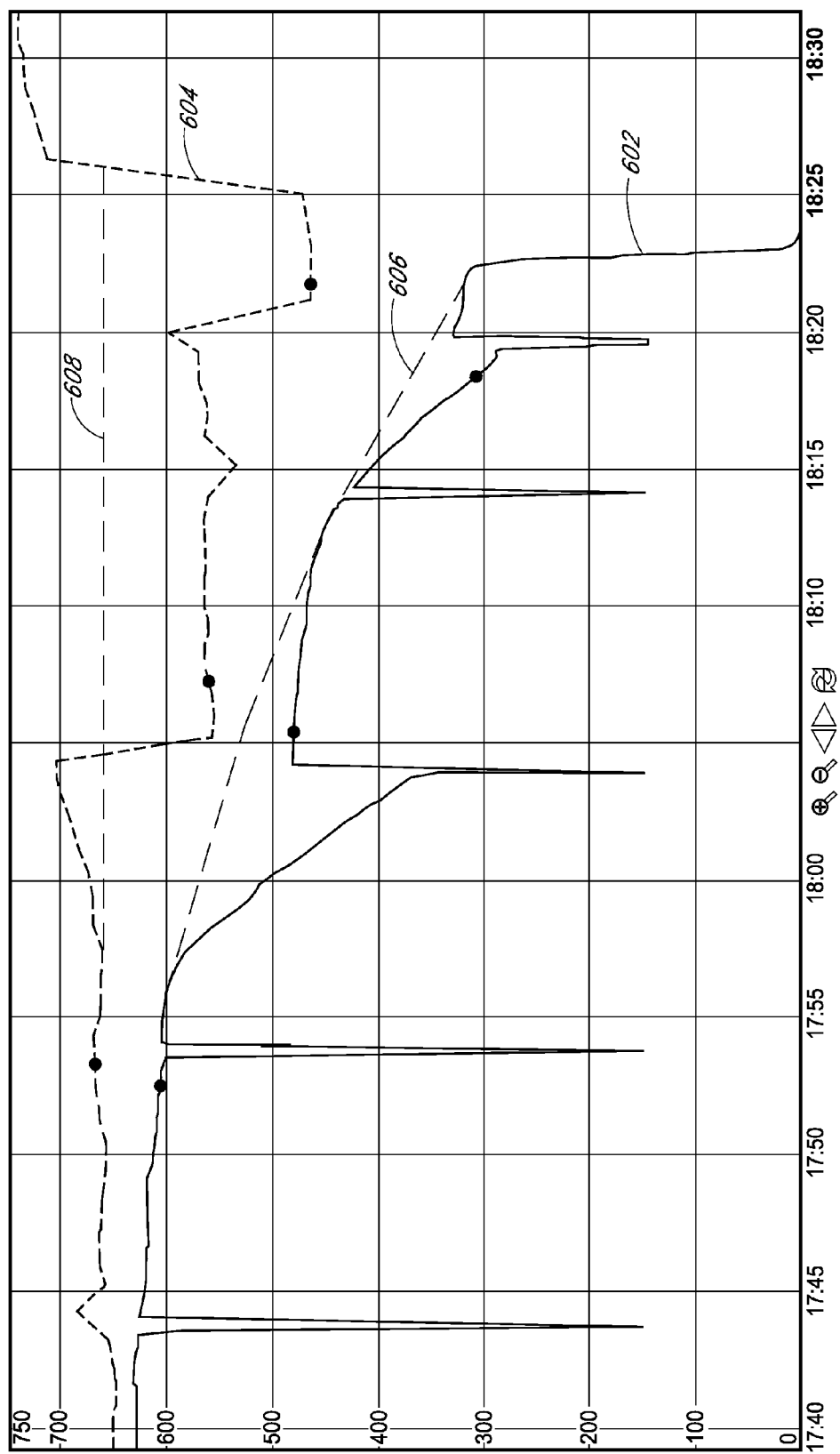
FIG. 6 shows an example power production profile, according to some embodiment.

FIG. 6 shows the result of operation of an MPPT algorithm operation (solid lines) without row independence as shown in FIG. 4 superimposed by the independent row MPPT operation (dashed lines). The area between the bottom two curves 602 and 606 illustrates the additional energy/power production that can be harnessed using this approach, for example, from the additional available power in the mornings and evenings when tracker-to-tracker shading is more prevalent. As one example, the additional energy captured can be on the order of approximately 0.6% or more. The top two curves 604 and 608 (voltage) emphasize the signal stability of the independent row approach versus the MPPT sweep approach, according to one embodiment.

In addition to increased power production, another benefit of the electrically independent row tracker is that certain types of receiver bypass diodes and the corresponding circuit formation components can be eliminated. Receiver bypass diodes are generally installed in single-pole junction boxes or within the PV laminate. The bypass diodes are used to bypass one or more solar cells or PV receivers that are fully shaded. In the independent row MPPT approach, the diodes are not activated during tracker-to-tracker shading. In the event of localized shading, though, the in-laminate diodes can still provide bypass functionality.

Another benefit of the disclosed techniques is a smaller operating range of inverter DC voltage. Because incremental fractions of the string voltage are not removed by the bypass diode activations, each MPPT can maintain operation within a smaller voltage range that may only be altered by the total irradiance reaching the solar cells within the string. This benefit can eliminate complications in the inverter circuit topology and can also result in more consistent DC-to-AC conversion efficiency. This smaller voltage range is also illustrated in FIG. 6.

Figure 7:
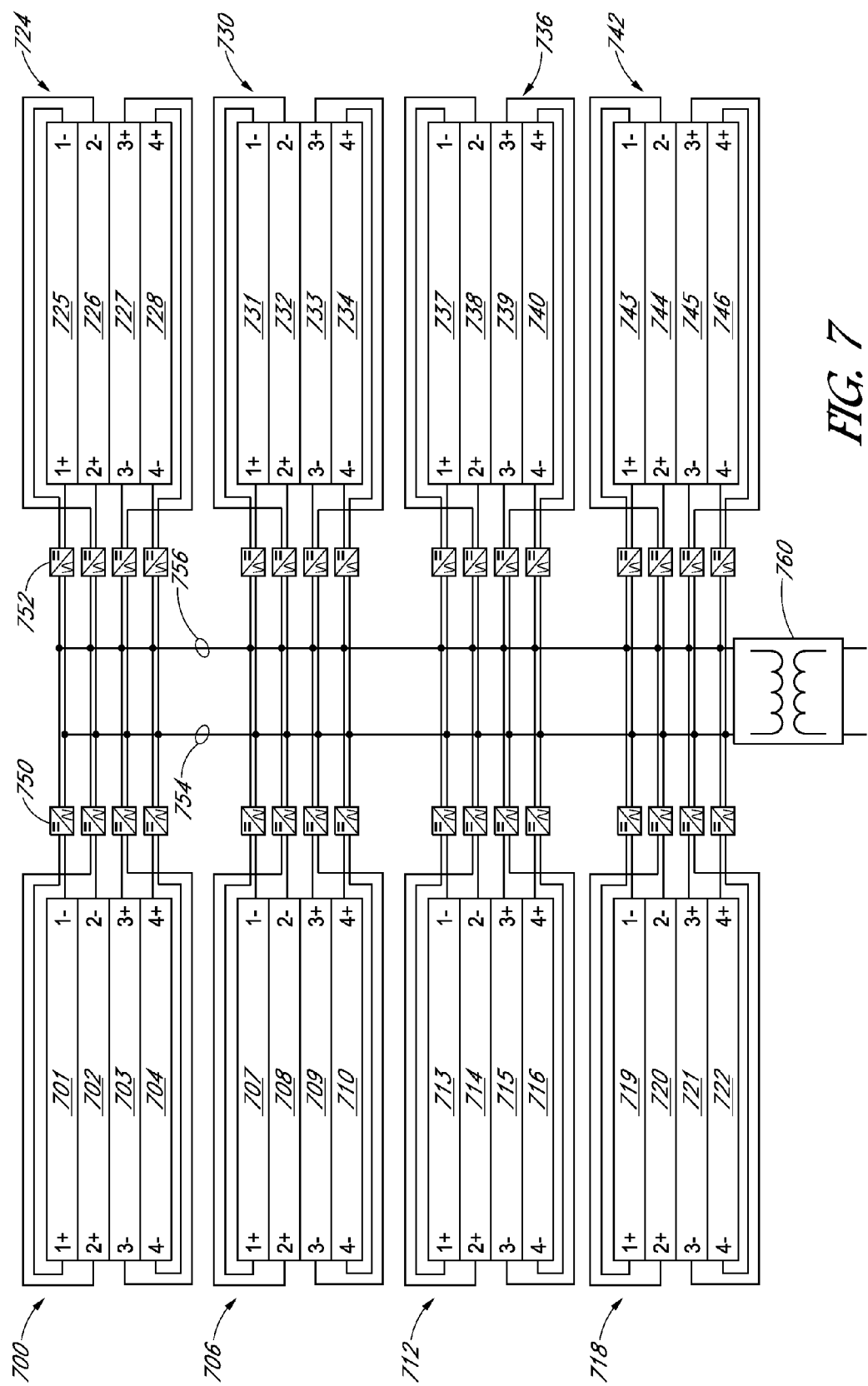
FIGS. 7 and 8 illustrate example electrical bus configurations among trackers, according to some embodiments.
Figure 8:
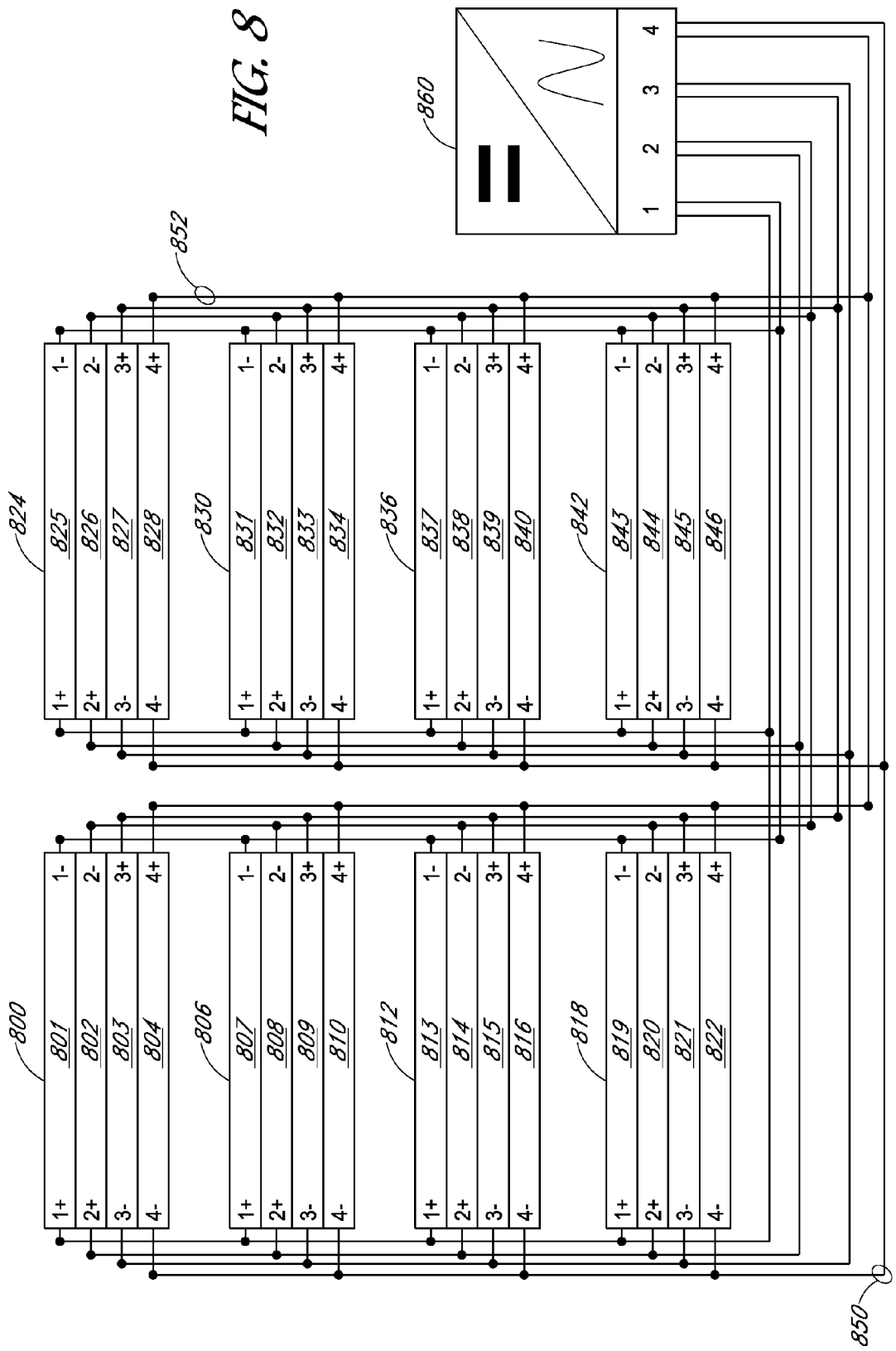

FIGS. 7 and 8 illustrate example parallel bus configurations among four-row solar trackers for an example PV system. Individual solar collection devices are not illustrated in the rows of the trackers for clarity of the Figures but are present nevertheless. Generally speaking, FIG. 7 illustrates a configuration using a string inverter and corresponding MPP module for each row of a tracker. The output of each string inverter/MPP module is then combined over a parallel bus and provided to a transformer. FIG. 8 illustrates a configuration using a central inverter with multiple MPP modules, one MPP module for each group of corresponding rows. Additional details of each configuration are provided below.

Turning to FIG. 7, in one embodiment, each of trackers 700, 706, 712, 718, 724, 730, 736, and 742 include four rows with each row having a respective positive terminal at one end and a negative terminal at the other end, for example, as illustrated by 1+ and 1− in row 701 of tracker 700. The row or string terminations can be coupled together in a parallel bus down the length of trackers, which can provide the opportunity to combine power from those rows without exceeding the string voltage limits.

As illustrated in FIG. 7, the positive and negative terminals of a particular row of a particular tracker can be coupled to a string inverter, such as string inverter 750, and its MPP module. In one embodiment, the negative outputs of the string inverters can be combined together in a negative parallel bus 754 and the positive outputs of those inverters can be combined together in a positive parallel bus 756. The positive and negative parallel buses can then be coupled to transformer 760 to further convert or modify the voltages (e.g., convert to 480V for coupling to a grid).

Turning to the example of FIG. 8, as was the case in FIG. 7, each of trackers 800, 806, 812, 818, 824, 830, 836, and 842 include four rows with each row having a respective positive terminal at one end and a negative terminal at the other end, for example, as illustrated by 1+ and 1− in row 801 of tracker 800. In contrast to the configuration shown in FIG. 7, however, the configuration of FIG. 8 illustrates a positive parallel bus and a negative parallel bus for each group of corresponding rows. For example, rows 804, 810, 816, 822, 828, 834, 840, and 846 can have their positive terminals coupled together via a positive parallel bus 852 and can have their negative terminals coupled together via a negative parallel bus 850. Positive parallel bus 852 and negative parallel bus 850 can be coupled to an MPP module, labeled as '4' located in central inverter 860. Likewise, other rows can be grouped accordingly with their respective positive and negative terminals coupled together via positive and negative parallel buses and then coupled to another MPP module or another channel of a single MPP module of inverter 860. The MPP module or channel of an MPP module can be configured to perform maximum power point tracking for the row(s) coupled to the MPP module or channel of the MPP module. The example of FIG. 8 illustrates four separate positive and four separate negative parallel buses with each pair of positive and negative parallel buses corresponding to a particular row of the trackers.

In one embodiment, for a particular group of rows having a single MPP module, the rows may have a similar shading profile such that row independence applies at the tracker level but corresponding rows from different trackers can be coupled together, whether serially or via a parallel bus, and then to a single MPP module. Because the corresponding rows have a similar shading profile, the single MPP module can be used for the group of rows and avoid getting stuck on a local MPP. Accordingly, the configuration shown in FIG. 8 with groups of rows from different trackers sharing a single MPP module in a central inverter can result in cost savings by using less equipment.

Note that configurations other than those illustrated in FIGS. 7 and 8 can be used as well. For instance, in one embodiment, multiple central inverters can be used instead of a single central inverter or a string inverter per row per tracker. In another embodiment, a row and its corresponding row on another tracker can be combined together into a single string and a string inverter can be implemented on a one-string-inverter-per-row-per-every-two-trackers basis, thereby reducing the number of string inverters illustrated in FIG. 7 by 50%.

The disclosed wiring can permit separate MPPT control modules to be used, whether in separate string inverters or in a central inverter, for PV strings or rows that exhibit similar shading profiles during the day. And such separate MPPT control can inhibit the formation of local MPPTs.

Figure 9:
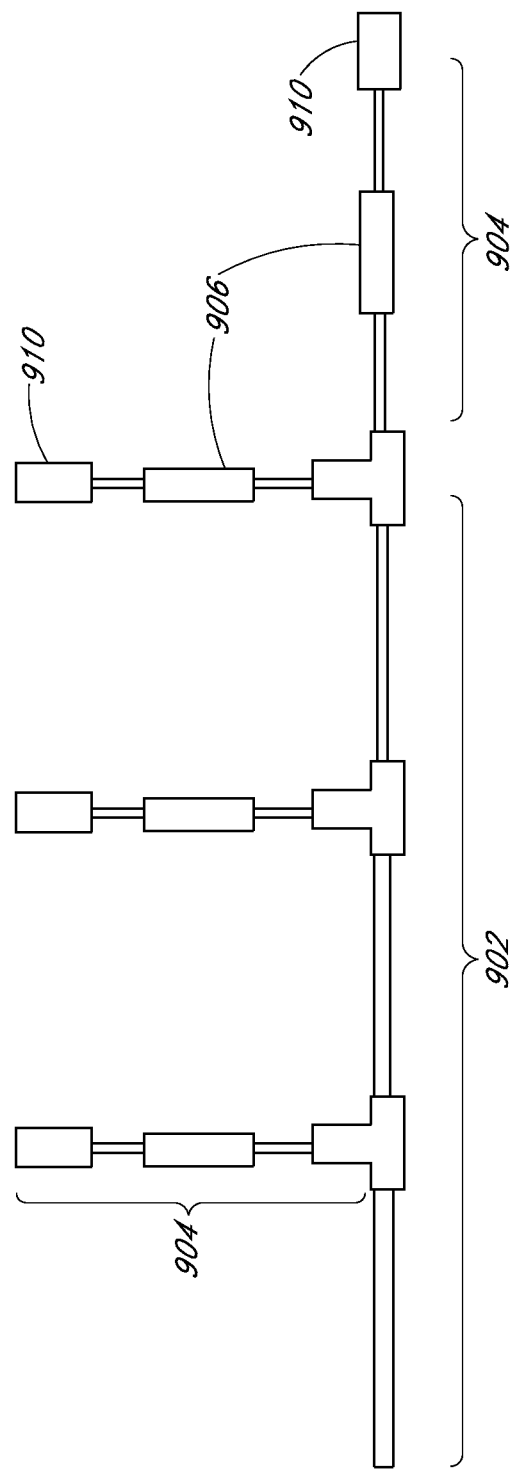
FIG. 9 illustrates a trunk and drop wire harness, according to some embodiments.

Turning now to FIG. 9, a trunk and drop wire harness that can be used to make the connections to a parallel bus is illustrated, according to some embodiments. T-connections can be made at an interface between a trunk 902 and a drop (e.g., drop 904). In one embodiment, each drop can have an inline fuse 906 and connectorized end 910 for connection to the PV string or row. In one embodiment, the rightmost drop 904 can carry a single PV string current and extend to the trunk end to save on cable costs. The trunk and drop wire harness can make drop connections from PV string row terminating nodes to a large conductor (a parallel bus) that feeds into an input of an inverter with a MPPT control module.

Because buses (e.g., one for each polarity for every row on a single solar tracker) can be connected directly to the inverter inputs, fusing of the PV strings (rows) can be provided along the bus. Placing fuses in-line with the PV string (row) drops to the trunk can allow for the protection of each row from overcurrent.

Figure 10:
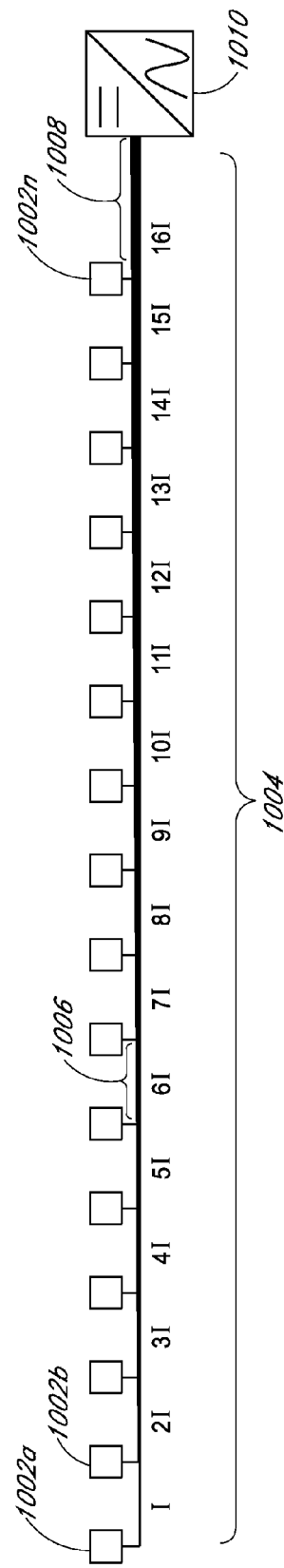
FIG. 10 illustrates a trunk bus cable, according to some embodiments.

FIG. 10 illustrates a trunk bus cable for a parallel bus, according to some embodiments. As shown, with the connection of each successive tracker row (shown as boxes, such as tracker rows 1002a to 1002n), the current in the trunk cable increases by 'I' (the string current of the row). To accommodate the increased current the trunk gauge can be larger with each added tracker row as necessary, with the thickest trunk bus cable immediately before the inverter 1010, according to some embodiments. That is, instead of using a uniform trunk bus cable, the trunk bus cable diameter may be larger as each successive drop connection node pushes the current carried in the trunk bus cable beyond the current capacity limits of the gauge of the previous section of the trunk bus cable. As such, the gauge of the trunk bus at portion 1006 is smaller than the gauge at trunk bus portion 1008. Much of the copper (or other conductive material) used in a fixed size trunk bus cable is unnecessary because the current carrying capacity required is well below the rated capacity of the large uniform trunk bus cable for most of the bus length. Accordingly, this approach can save on the cost of raw copper (or other conductive material) utilized.

In one embodiment, the cables can include cable piercing connectors, which can utilize conductive teeth to pierce the insulating cable jackets of the trunk cables and form an electrically conductive path between the PV string drop cables and the trunk bus cable. In the case of a preassembled harness, copper drop cables can join the trunk bus cable in T-joints with an insulating jacket molded over the single piece harness. In the case of cable piercing connectors, the PV string drops can be connected to a separate bus cable in the field during construction. Preassembled drops may still be used to incorporate in-line fuse holders, and in some instances, a preassembled trunk consisting of conductors of having different diameters along the trunk bus cable length may be used.

Figure 11:
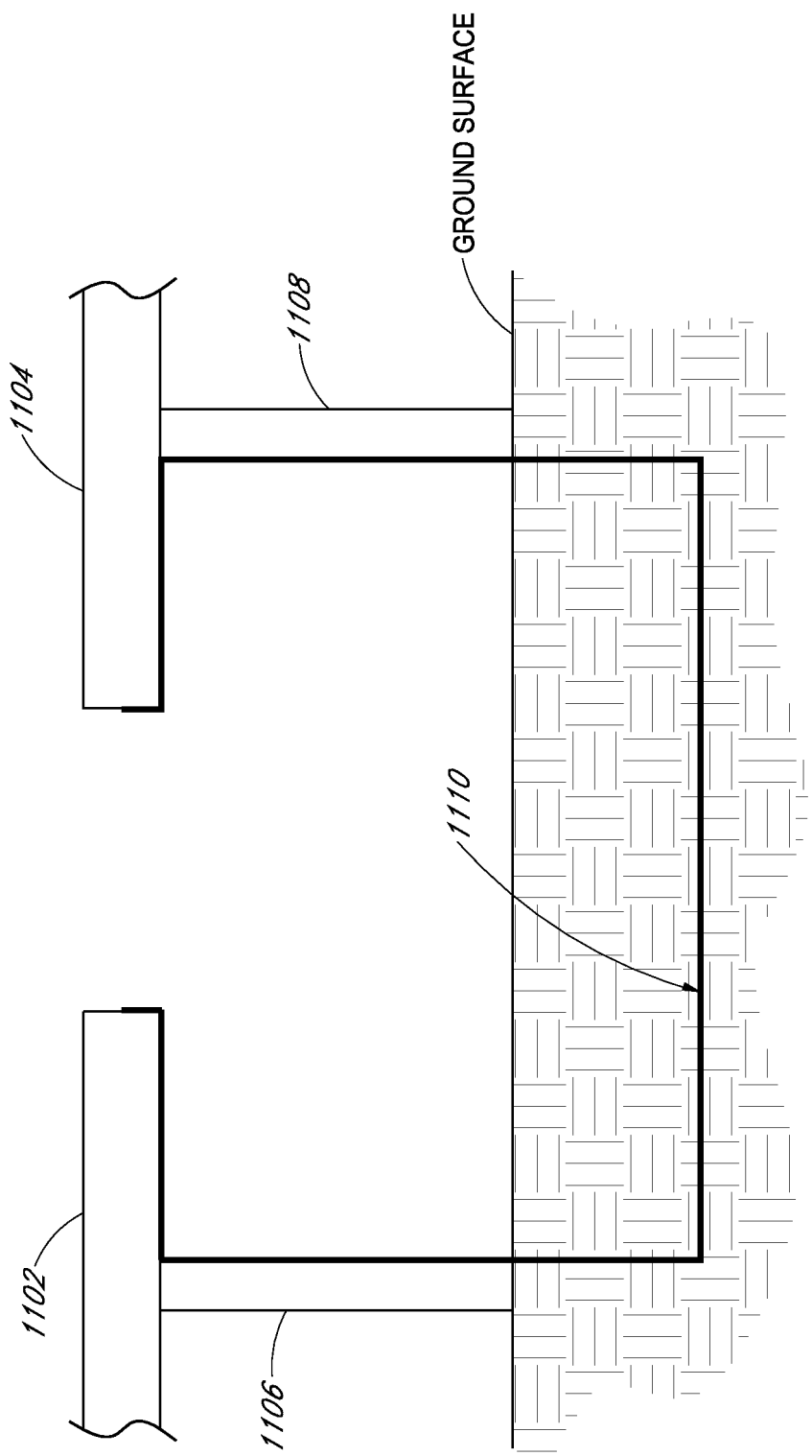
FIG. 11 illustrates a series connection of tracker rows, according to some embodiments.

FIG. 11 illustrates a series connection of tracker rows, according to some embodiments. As shown, FIG. 11 illustrates a series connection of tracker rows via cable routed to a tracker pile 1106, below ground 1110 and back up an adjacent tracker pile 1108. This electrical connection configuration may use one cable connection for each tracker row, according to some embodiments.

As one example, for solar tracker rows that operate well below a component rating, e.g., 1000V, the same row on north-south adjacent trackers may be connected in series, routing cables under the ground between solar trackers as shown in FIG. 11. This may increase the power carried by the conductors for a given current and reduce the associated $I^2R$ losses in proportion to the net generated power. In another embodiment, instead of routing cables underground, the cables can be tethered between rows above ground, provided they are supported properly and sized with enough slack.

One benefit of the disclosed structures and techniques can be a finer granularity of MPPT control and full utilization of separate MPPT modules in a central inverter. This finer granularity of MPPT control can allow an improvement in power yield as well as the elimination of certain types of solar collection device bypass diodes. For instance, solar collection device bypass diodes may not need to be activated when shaded tracker rows are connected to isolated MPPTs and therefore may not be necessary.

Additionally, the inverter(s) can function within a tighter operating voltage range. This is because the characteristic voltage steps seen when bypass diodes turn on may no longer occur without bypass diodes present.

One benefit of the trunk and drop configuration based parallel buses is the elimination of a conventional combiner box enclosure. As described above, the PV string or row fusing functionality may be integrated into a wire harness and a DC disconnect functionality may be integrated into an AC station.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A photovoltaic (PV) system, comprising:
a first string of PV collection devices;
a second string of PV collection devices;
a first positive parallel bus coupled to a positive terminal of the first string and to a positive terminal of the second string; and
a first negative parallel bus coupled to a negative terminal of the first string and to a negative terminal of the second string;
wherein the first positive parallel bus and the first negative parallel bus are coupled to a first maximum power point tracking module;
with the first maximum power point tracking module is housed in a central inverter;
wherein the central inverter comprises a second maximum power point tracking module coupled to a second positive parallel bus and second negative parallel bus, wherein the first and second maximum power point tracking modules are configured to perform maximum power point tracking independently from one another.

2. The PV system of claim 1, wherein the first and second strings are corresponding strings of first and second trackers, respectively.

3. The PV system of claim 2, further comprising:
a third string of PV collection devices of the first tracker;
a fourth string of PV collection devices of the second tracker, wherein the third and fourth strings are corresponding strings;
a second positive parallel bus coupled to a positive terminal of the third string and to a positive terminal of the fourth string; and
a second negative parallel bus coupled to a negative terminal of the third string and to a negative terminal of the fourth string.

4. The PV system of claim 2, wherein the first and second trackers are concentrating PV trackers.

5. The PV system of claim 1, wherein the first string of PV collection devices is a first row of a first concentrating PV tracker; and wherein the second string of PV collection devices is a corresponding first row of a second concentrating PV tracker.

6. The PV system of claim 1, wherein, during operation, the first and second strings have a substantially similar shading profile.

7. The PV system of claim 1, wherein a thickness of the first positive parallel bus is smaller between the first and second strings than between the second string and an inverter to which the first positive parallel bus is coupled.

8. The PV system of claim 1, wherein the first and second strings are coupled to the first positive parallel bus via first and second drop connections.

9. The PV system of claim 8, wherein the first and second drop connections each include a respective in-line overcurrent protection device.

10. The PV system of claim 8, wherein the first and second drop connections include respective cables having conductive teeth, wherein the conductive teeth are coupled directly to the first positive parallel bus through an insulating jacket of the first positive parallel bus.

11. The PV system of claim 1, wherein a first PV tracker comprises the first string of PV collection devices, further comprising:
a second PV tracker comprising a third string of PV collection devices, wherein the first string and third string are coupled together in series.

12. A photovoltaic (PV) system, comprising:
a first string of PV collection devices of a first tracker;
a corresponding first string of PV collection devices of a second tracker;
a first parallel bus coupled to the first strings of PV collection devices of the first and second trackers; and
an inverter coupled to the first parallel bus;
wherein the inverter includes a maximum power point tracking module configured to perform maximum power point tracking for the first strings of PV collection devices of the first and second trackers; and
further comprising:
a second string of PV collection devices of the first tracker;
a corresponding second string of PV collection devices of the second tracker; and a second parallel bus coupled to the second strings of PV collection devices of the first and second trackers, wherein the second parallel bus is coupled to the inverter.

13. A photovoltaic (PV) system, comprising:
a first plurality of corresponding strings of PV collection devices of a plurality of PV trackers;
a first positive parallel bus coupled to respective positive terminals of the first plurality of corresponding strings; and
a first negative parallel bus coupled to respective negative terminals of the first plurality of corresponding strings;
a second plurality of corresponding strings of PV collection devices of the plurality of PV trackers;
a second positive parallel bus coupled to respective positive terminals of the second plurality of corresponding strings; and
a second negative parallel bus coupled to respective negative terminals of the second plurality of corresponding strings;
with at least one maximum power point tracking module coupled to the first and second positive and negative parallel buses, wherein the at least one maximum power point tracking module is configured to perform maximum power point tracking separately for the first and second plurality of corresponding strings.

* * * * *